United States Patent [19]
Boigenzahn et al.

[11] Patent Number: 5,636,090
[45] Date of Patent: Jun. 3, 1997

[54] TILT LIMITING INERTIAL ACTUATOR LATCH FOR A DATA STORAGE SYSTEM

[75] Inventors: Jeffrey F. Boigenzahn, Pine Island; Douglas W. Johnson, Rochester; Richard E. Lagergren, Rochester; James M. Rigotti, Rochester, all of Minn.

[73] Assignee: International Business Machines Corporation, Armonk, N.Y.

[21] Appl. No.: 323,915

[22] Filed: Oct. 17, 1994

[51] Int. Cl.⁶ .................................................. G11B 5/54
[52] U.S. Cl. ................................................... 360/105
[58] Field of Search ................................. 360/105, 106, 360/86, 97.02, 97.01; 369/244, 247, 251; 292/129, 229, DIG. 22

[56] References Cited

U.S. PATENT DOCUMENTS

| | | | |
|---|---|---|---|
| 4,562,500 | 12/1985 | Bygdnes | 360/86 |
| 4,647,997 | 3/1987 | Westwood | 360/105 |
| 4,692,829 | 9/1987 | Campbell | 360/105 |
| 5,043,834 | 8/1991 | Kubo et al. | 360/105 |
| 5,124,867 | 6/1992 | Kitahori et al. | 360/105 |
| 5,189,576 | 2/1993 | Morehouse et al. | 360/105 |
| 5,208,713 | 5/1993 | Lindsay et al. | 360/105 |
| 5,296,986 | 3/1994 | Morehouse et al. | 360/105 |
| 5,305,170 | 4/1994 | Dion | 360/105 |
| 5,404,257 | 4/1995 | Alt | 360/105 |

*Primary Examiner*—Craig A. Renner
*Attorney, Agent, or Firm*—Merchant, Gould, Smith, Edell, Welter & Schmidt

[57] ABSTRACT

A novel inertial actuator latch assembly adapted for use within the compact housing configuration of a very small form factor data storage system comprises an actuator latch and a separate latch spring. A portion of an inertia member of the actuator latch extends over a portion of a surface of the data storage disk and is separated therefrom by a clearance gap having a size typically on the order of tenths of a millimeter. A novel tilt limiting apparatus prevents deleterious contact between the inertia member and the sensitive surface of the data storage disk in response to a strong external rotational shock force being exerted on the data storage system housing. Automatic registration and coupling features provide for easy and efficient installation of the tilt limiting inertial actuator latch assembly in a top-down assembly process.

19 Claims, 9 Drawing Sheets

TILT LIMITING INERTIAL ACTUATOR LATCH FOR A DATA STORAGE SYSTEM

FIELD OF THE INVENTION

The present invention relates generally to data storage systems, and more particularly, to an inertial actuator latch assembly for use in a small form factor data storage system.

BACKGROUND OF THE INVENTION

In the data storage system manufacturing industry, various methods have been employed to minimize the detrimental influence of strong external rotational shock forces on the operation of the sensitive components comprising a data storage system. A typical data storage system includes one or more data storage disks coaxially mounted on a hub of a spindle motor. The spindle motor rotates the disks at speeds typically on the order of several thousand revolutions-per-minute. Digital information is typically written to and read from the data storage disks by one or more magnetic transducer heads, or read/write heads, which are passed over the surfaces of the rotating data storage disks.

An actuator typically includes a plurality of outwardly extending actuator arms adapted to interleave one or more magnetic transducer heads mounted thereon into and out of the stack of data storage disks. During periods of data storage system inactivity, the actuator is often restrained in a predetermined parked position by a passive locking or parking mechanism, such as a parking ramp apparatus, for example. The magnetic transducer heads are usually parked beyond the outer diameter of the data storage disks or over a dedicated portion of the disk, often termed a landing zone, situated away from the data storage portions of the disk.

Mishandling of either the data storage system or a computer system into which the data storage system is installed often results in displacement of the actuator from its parked position. Such direct and indirect mishandling often subjects the sensitive internal components of the data storage system to significantly large rotational shock forces. The rotatably mounted actuator is generally susceptible to rotational forces and often rotates out of the parked position when the data storage system is subjected to a sufficiently strong rotational shock force. Unrestrained movement of the actuator typically results in varying degrees of permanent damage to the sensitive surfaces of the data storage disks and to the magnetic transducer heads. A damaged region of the disk is generally unusable for subsequent storing of data. Also, if the disk is damaged, any data stored at the damaged location may be lost.

Figure 1:
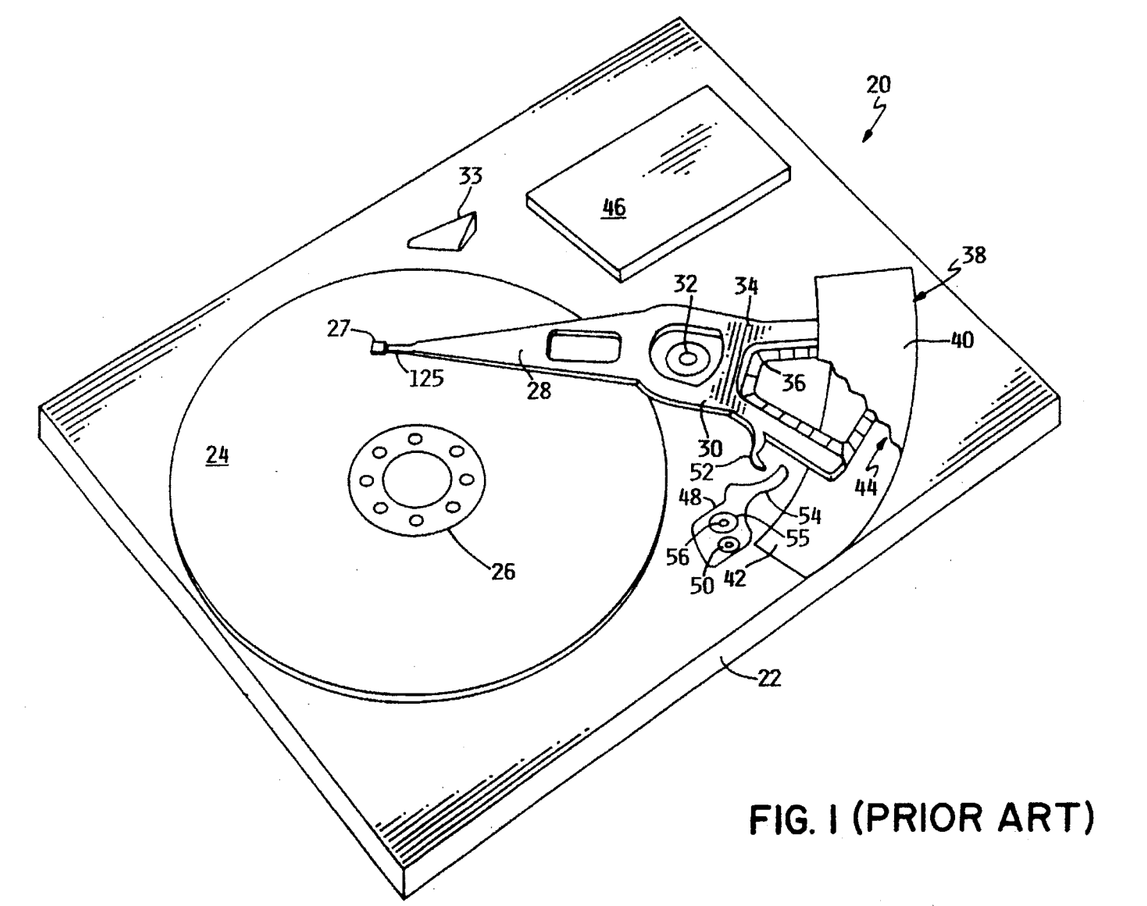
FIG. 1 is an illustration of a typical data storage system with the cover of the housing removed and a prior art inertial latch installed on the base of the housing.

Various methods and apparatus have been developed to reduce the potentially catastrophic results of unrestrained actuator rotation out of the parked position during periods of data storage system inactivity. One conventional technique employs an apparatus that passively latches the actuator in a parked position until the external rotational shock forces applied to the data storage system are dissipated. A known method for minimizing unintended rotation of the actuator is illustrated in FIG. 1. An inertial latch 48 is typically mounted for rotation about a pivot axis 56, and includes a weighted portion 50 and hook portion 54. In response to a sufficiently strong rotational shock force applied to the data storage system 20, the hook portion 54 of the inertial latch 48 typically rotates about the pivot axis 56 and engages a receiving hook 52 protruding from the actuator 30. A biasing mechanism 55 is generally employed to return the inertial latch 48 to its original position. It is noted that the data storage system 20 illustrated in FIG. 1 is generally representative of a standard form factor data storage system having ample space available on the base 22 to accommodate the dimensions and rotation of a prior art inertial latch 48.

A trend has developed in the data storage system manufacturing community to miniaturize the chassis or housing of a data storage system to a size suitable for incorporation into miniature personal computers, such as lap-top computers, for example. Various industry standards have emerged that specify the external housing dimensions of small and very small form factor data storage systems. One such recognized family of industry standards is the PCMCIA (Personal Computer Memory Card Industry Association) family of standards, which specifies both the dimensions for the data storage system housing and the protocol for communicating control and data signals between the data storage system and a host computer system coupled thereto. Recently, four families or types of PCMCIA device specifications have emerged. By way of example, a Type-I PCMCIA data storage system must be fully contained within a housing having a maximum height dimension of 3.3 millimeters (mm). By way of further example, a Type-II PCMCIA device housing must not exceed a maximum height of 5.0 mm in accordance with the PCMCIA specification. A maximum height of 10.5 mm is specified for the housing of Type-III PCMCIA devices, and Type-IV devices are characterized as having a maximum housing height dimension in excess of 10.5 mm.

It is anticipated that the industry trend of continued miniaturization of data storage systems will eventually result in the production of systems complying with the Type-II PCMCIA specification. Such Type-II PCMCIA data storage systems will likely have external housing dimensions of approximately 54 mm×86 mm×5 mm, and include a data storage disk having a diameter of approximately 45 mm and a width dimension similar to that of a standard credit card. It will likely be desirable to employ an inertial latch assembly within such small and very small form factor data storage systems, such as Type-II PCMCIA data storage systems. Those skilled in the art, however, will appreciate the difficulties associated with employing an inertial latch mechanism suitable for use within these very small form factor (VSFF) data storage systems. The maximum allowable housing dimensions imposed by the Type-II PCMCIA specification, for example, necessarily results in a highly compact packaging configuration within the data storage system housing, with minimal clearance and tolerances afforded between adjacent components.

Employment of a prior art inertial latch 48, such as the one depicted in FIG. 1, within the compact environment of a VSFF data storage system is generally considered problematic for a variety of reasons. Conventional inertial latches 48 generally occupy an appreciable amount of space on the housing base 22 of a data storage system 20 in order to permit the weighted portion 50 and elongated hook end 54 to freely rotate into and out of engagement with the actuator 30 unimpeded by other components mounted on the housing base 22. Also, prior art inertial latches 48 are typically situated within the housing 20 far away from the sensitive data storage disks 24 to avoid any possible contact therewith. These and other characteristics of prior art inertial latches generally represent significant limitations in the development and optimization of the component layout within the limited space of a VSFF data storage system.

Figure 2:
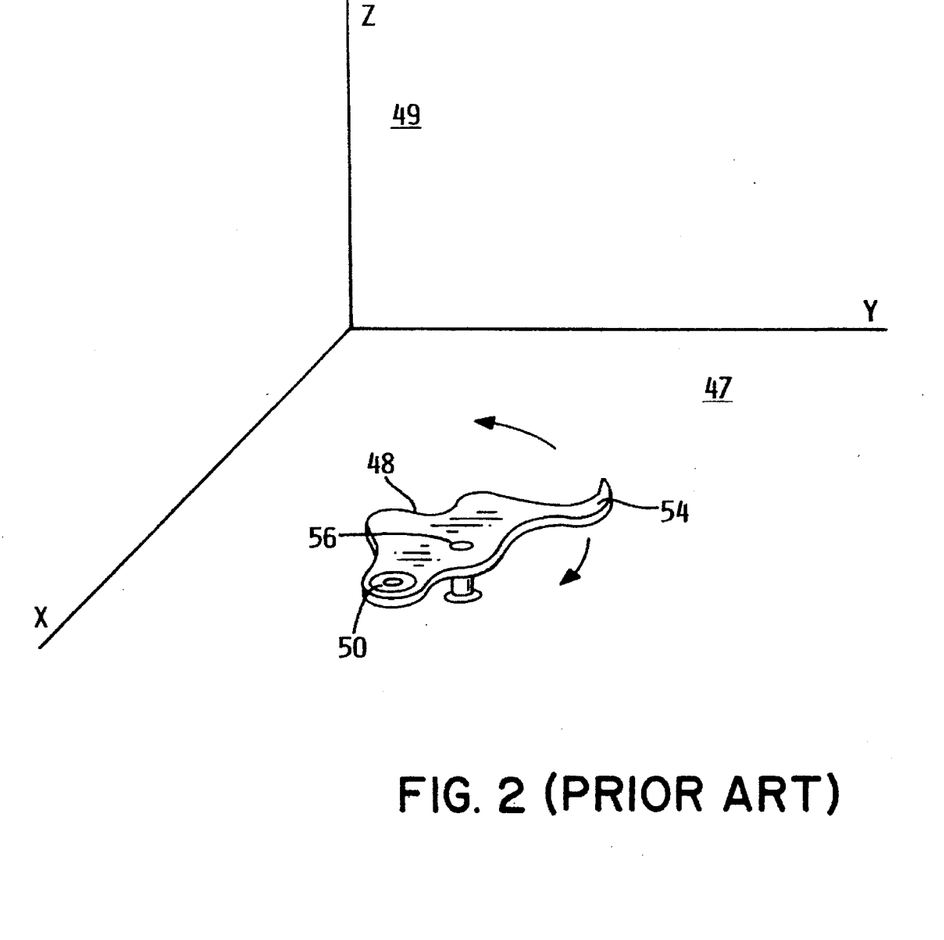
FIG. 2 is a characterization of the typical rotational movement of a prior art inertial latch within an X-Y plane of rotation being substantially parallel to a plane of rotation defined by a data storage disk rotatably mounted within the data storage system housing.

Further, as illustrated in FIG. 2, conventional inertial latches 48 are typically designed to operate within a plane 47 of rotation (X-Y plane) substantially parallel to a plane defined by the rotation of the data storage disk 24. A prior art inertial latch 48 is generally designed to sweep through a predetermined arc within the X-Y plane 47 when activated. Such conventional inertial latch 48 designs are generally directed exclusively to operation within this X-Y plane of rotation 47, with little or no consideration given to the advantages and disadvantages associated with operation in the vertical Z direction 49 with respect to the X-Y plane 47.

There is a desire within the data storage system manufacturing community to minimize potential damage to the sensitive internal components of a miniature data storage system when the system is subjected to strong rotational shock forces. There exists a further desire to incorporate the advantageous attributes of an inertial latch within the compact packaging configurations of small and very small form factor data storage systems produced in a high-volume, cost-sensitive manufacturing environment. The present invention fulfills these and other needs.

SUMMARY OF THE INVENTION

The present invention is an inertial actuator latch adapted for use in a data storage system having a relatively compact housing configuration. The novel inertial actuator latch prevents undesirable rotation of the actuator during non-operation of the data storage system, and employs a novel tilt limiting apparatus to prevent deleterious contact between the actuator latch and a data storage disk disposed within the data storage system. The unique tilt limiting actuator latch assembly is preferably configured for efficient installation in, and removal from, the compact environment of small and very small form factor data storage systems.

DETAILED DESCRIPTION OF THE PREFERRED EMBODIMENTS

Referring now to the drawings, and more particularly to FIG. 1, there is shown a substantially standard form factor data storage system 20 mounted on a housing base 22, with the housing cover 23 removed from the base 22. The data storage system 20 typically includes one or more rigid data storage disks 24 which are stacked coaxially in a tandem spaced relationship, and rotate about a common motor spindle 26 at a relatively high rate of rotation. An actuator 30 typically includes a plurality of interleaved actuator arms 28, with each arm having one or more magnetic transducer heads 27 mounted to a load beam 125 for reading and writing information magnetically onto the magnetic storage disks 24. The actuator 30 is usually mounted to a stationary actuator shaft 32, and rotates thereon to move the actuator arms 28 into and out of the stack of magnetic storage disks 24.

A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surfaces of the data storage disks 24. The motor spindle 26 typically comprises a three-phase a.c. motor energized by a power supply 46 for rotating the data storage disks 24 at a relatively high rate of rotation. The coil assembly 36 and the upper and lower magnet assemblies 40 and 42 of the permanent magnet structure 38 operate in cooperation as a voice coil motor. The voice coil motor produces a torquing force on the actuator coil frame 34 of the actuator 30 when currents of varying direction and magnitude flow in the coil assembly 36 in the presence of a magnetic field produced by the permanent magnet structure 38. The torquing forces imparted on the actuator coil frame 34 of the actuator 30, in turn, cause corresponding rotational movement of the actuator arms 28 in directions dependent on the polarity of the currents flowing in the magnetic coil assembly 36.

Figure 3:
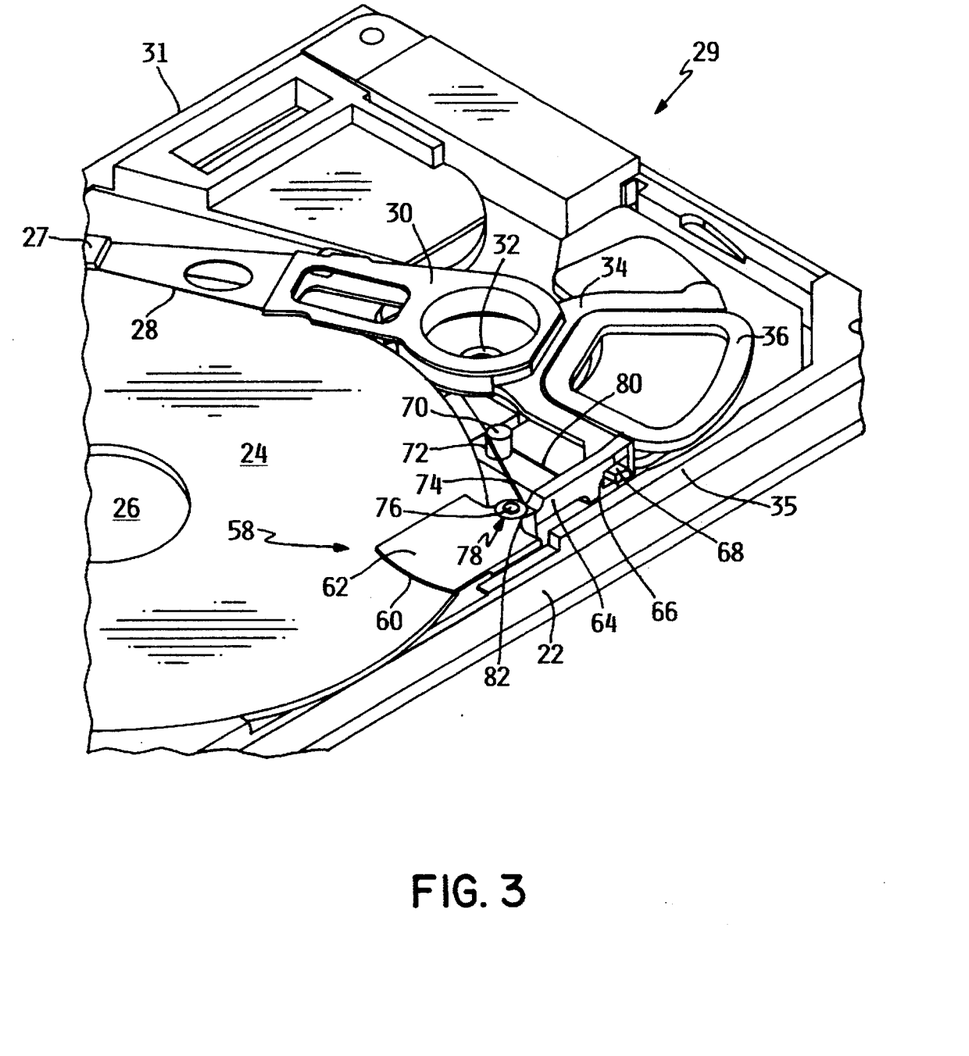
FIG. 3 is a top prospective view of a novel tilt limiting, actuator latch assembly installed in a VSFF data storage system.
Figure 4:
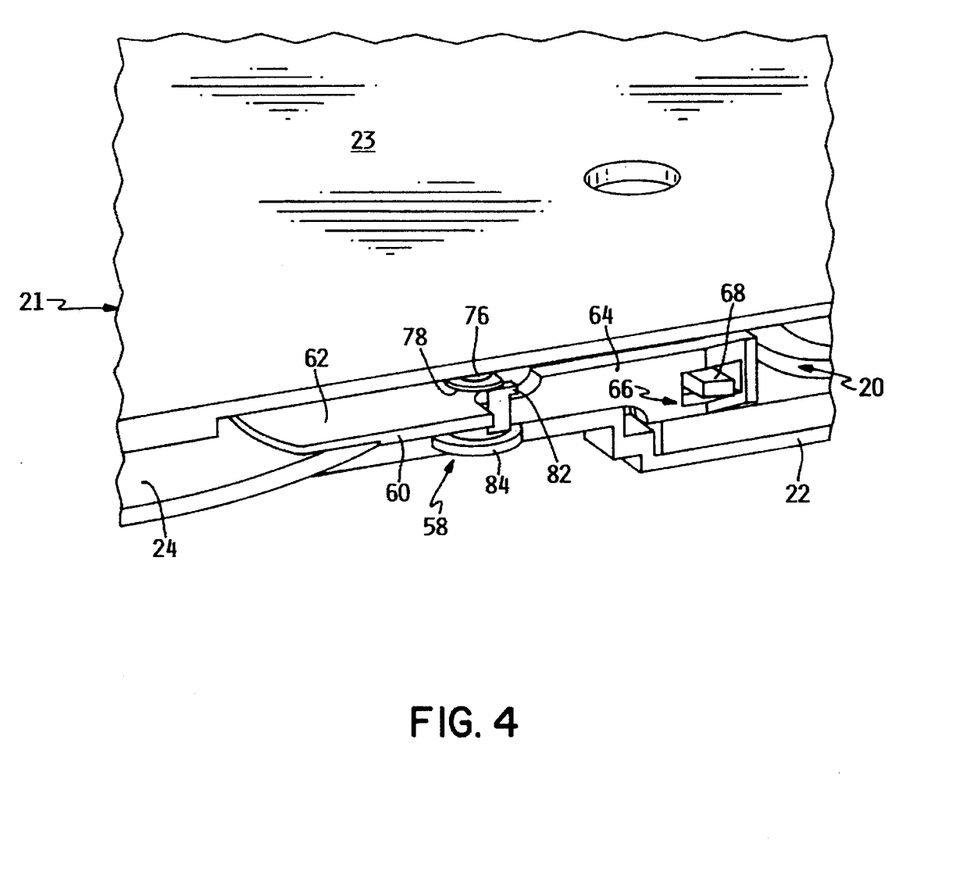
FIG. 4 is a side perspective view of a novel tilt limiting actuator latch assembly installed within the compact housing configuration of a VSFF data storage system.

Referring now to FIGS. 3 and 4, there is shown a novel tilt limiting actuator latch assembly 58 adapted for use in a VSFF data storage system 29. It is readily appreciated by those skilled in the art that industry recognized specifications applicable to VSFF devices, such as the Type-II PCMCIA standard for example, severely limit the maximum housing dimensions of a conforming data storage system, and, in particular, the space within the housing available to accommodate an inertial latch assembly. The maximum height dimensions, typically on the order of several millimeters, imposed by VSFF device specifications generally allow for only a small margin of tolerance between the sensitive components of a VSFF data storage system 29. The novel actuator latch assembly 58 prevents unrestrained actuator 30 rotation out of a parked orientation resulting from a strong external rotational shock force being applied to the housing 21, and prevents deleterious contact between the latch assembly 58 and the data storage disks 24 of a VSFF data storage system 29.

The novel actuator latch assembly 58, depicted in FIG. 3, is a simple and elegant two-part inertial latch assembly comprising an actuator latch 60 and a latch spring 72. The actuator latch 60 includes a hollow latch collar 78, an elongated restraining member 64 joined to the latch collar 78, and an inertia member 62 also joined to the latch collar 78. The actuator latch 60 is preferably mounted for rotation on a latch pin 76 provided on the base 22 of the data storage system housing 21, with the latch collar 78 adapted for registration with, and easy installation on, the latch pin 76. The elongated restraining member 64 of the actuator latch 60 preferably includes a restraining aperture 66 adapted to receive an actuator finger 68 disposed on the actuator 30. Engagement of the actuator finger 68 by the actuator latch 60 effectively restrains the actuator 30 in a parked position when the data storage system 29 is subjected to an external rotation shock force otherwise sufficient to displace the actuator 30 from the parked position.

The novel actuator latch 60 provides effective latching of an actuator 30 within the compact environment of a VSFF data storage system 29 by advantageously making use of the available space within the housing 21 defined between the data storage disk 24 and the cover 23 of the housing 21. Generally, a portion of the actuator latch 60 extends over a portion of a surface of the data storage disk 24. In the embodiments illustrated in FIGS. 3 and 4, a portion of the inertia member 62 extends over a portion of the upper surface of the data storage disk 24. Advantageous use of the space between the data storage disk 24 and a contact surface of the housing cover 23, heretofore unexploited in prior art inertial latching schemes, to accommodate rotation of a portion of the inertia member 62 permits employment of an inertial actuator latch assembly 58 within the compact environment of a VSFF data storage system housing 21, and, in addition, provides for easy and efficient installation and removal of the actuator latch 60 when assembling and repairing a VSFF data storage system 29.

An important advantage of the novel actuator assembly 58 concerns the tilt limiting capability of the actuator latch 60. The minimal clearance distance between the data storage disk 24 and the cover 23 of a VSFF data storage system housing 21 requires that the inertia member 62 rotate in very close proximity to the sensitive surface of the data storage disk 24. In one embodiment, for example, the clearance or disk gap between the surface of the data storage disk 24 and the inertia member 62 of the actuator latch 60 is on the order of tenths of a millimeter.

Any appreciable tilting or movement of the inertia member 62 toward the data storage disk 24 will generally result in deleterious contact with the surface of the data storage disk 24, typically resulting in catastrophic damage thereto and permanent loss of data stored thereon. The novel tilt limiting actuator latch assembly 58 prevents potential deleterious and catastrophic contact between the data storage disk 24 and the actuator latch 60 by limiting the maximum tilt or movement of the inertia member 62 toward the data storage disk 24. The novel tilt limiting capability of the actuator latch assembly 58 is realized by cooperative operation between the actuator latch 60 and the cover 23 of the data storage system housing 21 when a sufficiently strong rotational shock force is applied to the housing 21.

Figure 7:
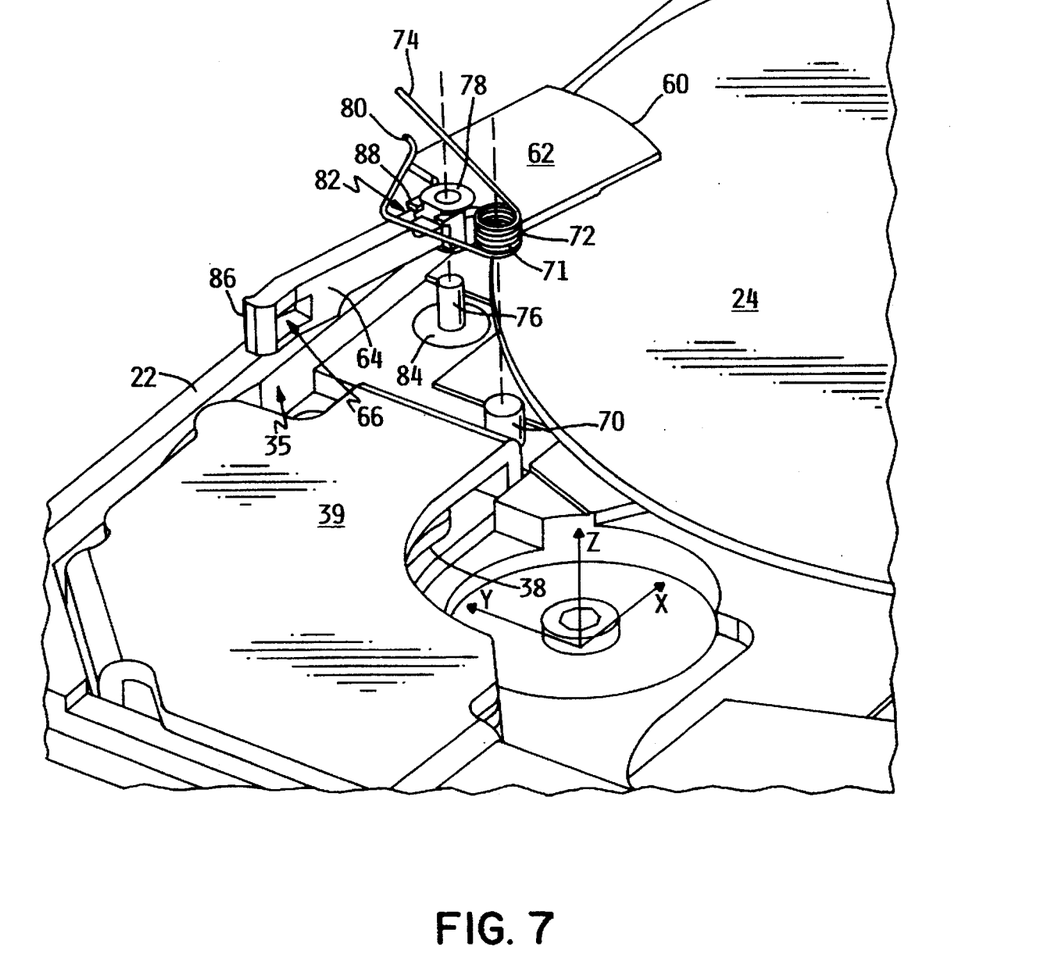
FIG. 7 is a top perspective view of a novel two-part actuator latch assembly adapted for easy installation in, and removal from, a VSFF data storage system.
Figure 8:
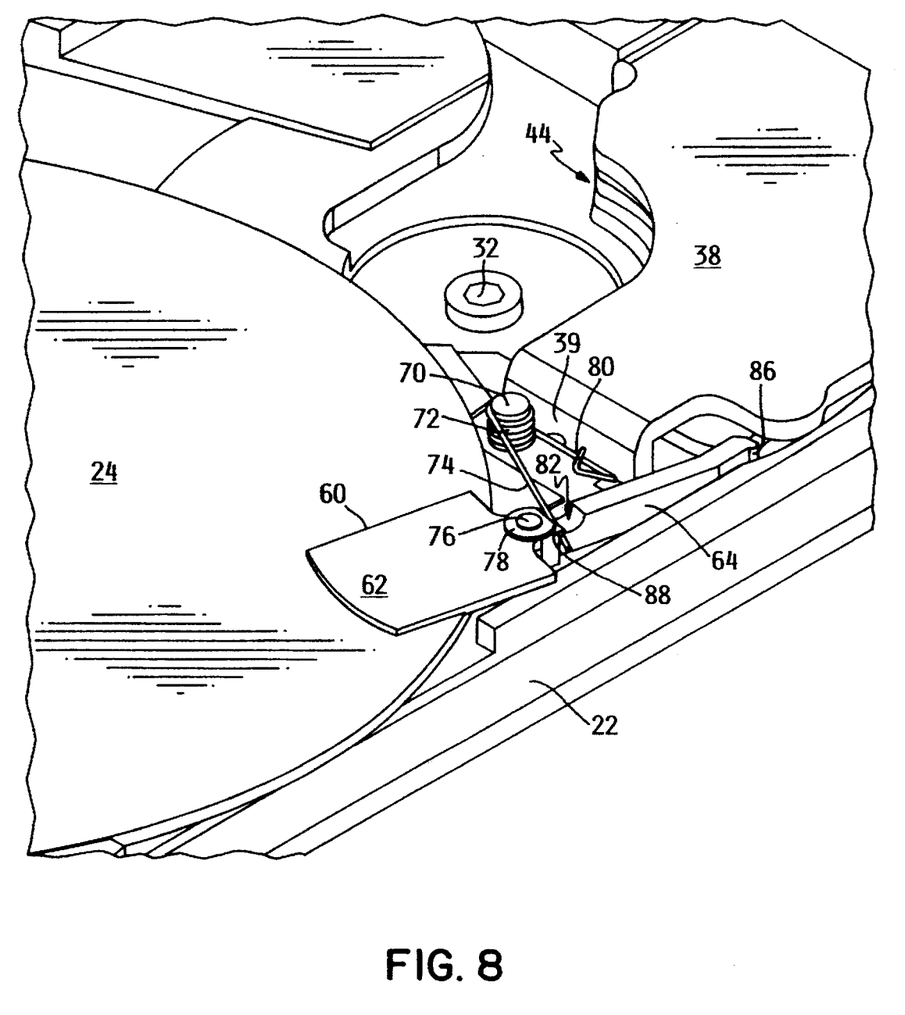
FIG. 8 is a top perspective view of a novel two-part actuator latch assembly installed in a VSFF data storage system.

The second component comprising the novel tilt limiting actuator latch assembly 58, as illustrated in FIGS. 3, 7, and 8, is the latch spring 72 shown mounted about a spring pin 70 provided on the base 22 of the data storage system housing 21. The latch spring 72 preferably includes a plurality of spring coils 71, configured for easy installation on the spring pin 70, a spring arm 74, and a spring hook 80. A spring hook 80 is preferably anchored against a fixed structure within the housing 21, such as the housing 39 of the permanent magnet structure 38. The spring arm 74 is adapted for automatic registration with and coupling to a locking slot 82 provided on the actuator latch 60. When installed, the spring coils 71 produce a torquing force which is translated to the spring arm 74 and sufficient to bias the actuator latch 60 in a non-engagement configuration with respect to the actuator 30.

When the data storage system 29 is not operating, the actuator arm 28 and transducer head 27 are typically restrained beyond the outer diameter of the data storage disk 24 by a parking mechanism, such as a parking ramp 33. Alternatively, the transducer head 27 may be positioned over a dedicated landing region or landing zone of the data storage disk 24 not intended for data storage. The parking mechanism 33 typically restrains the magnetic transducer head 27 on or over the landing region in a parked orientation during periods in which the data storage system is inactive in order to protect the sensitive data storing regions of the disk 24 from any deleterious contact with the transducer head 27. It is noted that conventional parking mechanisms 33 are typically designed to counteract the influence of minor external rotational shock forces that might otherwise result in unrestrained rotation of the actuator 30 out of the parked position.

When the magnetic transducer head 27 is restrained in a parked position, the actuator latch 60 remains in a non-interactive or non-engaging orientation with respect to the actuator 30. The latch spring 72 preferably exerts a biasing force against the actuator latch 60 sufficient to bias the restraining member 64 out of engagement with the actuator finger 68. In one embodiment, a latch stop 86 is provided on the restraining member 64 to contact a sidewall 35 of the housing base 22 when the latch spring 72 biases the actuator latch 60 in a non-engaging orientation.

If the data storage system is subjected to a sufficiently strong external rotational shock force, the actuator arm 28 may rotate away from the landing region and cause the magnetic transducer head 27 to contact and damage the data storage regions of the data storage disk 24. Unrestrained rotation of the actuator 30 away from the parked position resulting from a strong external rotational shock force is prevented by the inertial actuator latch 60 rotating from a non-engaging orientation to an engaging orientation with respect to the actuator 30. A sufficiently strong clockwise rotational shock force exerted on the data storage system housing 21, for example, will generally dislodge the actuator 30 from its parked position over the landing region, and cause the magnetic actuator arm 28 and transducer head 27 to rotate toward the motor spindle 26 in a counter-clockwise direction with respect to the system housing 21. The unrestrained rotation of the actuator 30 and transducer head 27 will typically result in varying degrees of damage to the data storage regions of the data storage disk 24.

In response to a strong clockwise rotational shock force applied to the housing 21, the actuator latch 60 rotates in a counter-clockwise direction about the latch pin 76, and engages the actuator 30 to prevent unrestrained rotation of the actuator 30 out of the parked position. The inertia produced by the inertia member 62 as it rotates in a counter-clockwise direction overcomes the bias force exerted by the latch spring 72, thereby causing the restraining member 64 of the actuator latch 60 to rotate toward the actuator finger 68 protruding from the actuator 30. The actuator finger 68 is then captured within the restraining aperture 66 of the restraining member 64, thus preventing the actuator 30 from rotating out of the parked position.

After the strong clockwise rotational shock force dissipates, the biasing force produced by the latch spring 72 and exerted on the actuator latch 60 urges the restraining member 64 to rotate out of engagement with the actuator finger 68, and causes the actuator latch 60 to return to its original non-engaging orientation.

In the embodiments illustrated in FIGS. 3-8, a strong counter-clockwise rotational shock force applied to the data storage system housing 21 will generally cause an unrestrained actuator 30 to rotate in a clockwise direction with respect to the data storage system housing 21. Any unrestrained clockwise rotation of the actuator 30 away from the data storage regions of the data storage disk 24 is generally of secondary concern. The actuator 30 preferably engages a crash stop provided on the parking mechanism 33 which prevents further rotation of the actuator arm 28 and transducer head 27 in a direction away from the motor spindle 26. The actuator latch 60 preferably remains in its non-engaging orientation when a strong counter-clockwise rotational shock force is exerted on the data storage system housing 21. The inertia of the inertia member 62, together with the biasing torque of the latch spring 72, force the latch stop 86 of the restraining member 64 against the sidewall 35 of the housing base 22. It is to be understood that the operation of the actuator latch assembly 58 would be substantially similar to that described above when the actuator 30 and actuator latch assembly 58 are installed adjacent the sidewall 31 opposite the sidewall 35 illustrated in FIG. 3. As such, the actuator latch 60 will engage the actuator 30 when the data storage system housing 21 is subjected to a sufficiently strong counter-clockwise rotation shock force to prevent unrestrained rotation of the actuator arm 28 in a clockwise direction.

To ensure reliable engagement between the actuator latch 60 and the actuator 30, the biasing force or torque produced by the latch spring 72 and imparted on the actuator latch 60 must be sufficient to maintain the actuator latch 60 in a non-engaging orientation in the absence of a strong external rotational shock force, while permitting rotation of the restraining member 64 and engagement with the actuator finger 68 upon the occurrence of a strong external rotational shock force. By determining the rotational moments of inertia of the inertia member 62 and the actuator 30, and the restraining force exerted on the actuator 30 by the actuator parking mechanism 33, the appropriate amount of spring torque to be developed by the latch spring 72 may be computed. In general, an appropriate amount of spring torque produced by the latch coils 71 and latch arm 74 will maintain the actuator latch 60 in a non-engaging relationship with respect to the actuator 30 in the presence of normal operating shock forces, while permitting the actuator latch 60 to rotate into an engaging orientation with respect to the actuator 30 in the presence of a relatively strong rotational shock force applied to the data storage system housing 21.

The novel tilt limiting actuator latch assembly 58 provides effective latching of an actuator 30 while preventing undesirable contact between the actuator latch 60 and the sensitive data storage disk surface 24 when employed in a VSFF data storage system 29. The actuator latch assembly 58, including the actuator latch 60, latch spring 72, and the apparatus for mounting the actuator latch assembly 58 to the housing 21 of a VSFF data storage system 29, must be constrained within a vertical spacing of only several millimeters, usually less than 5.0 millimeters for a Type-II PCMCIA data storage system housing, for example. It can be appreciated that a reduction in the maximum allowable height dimension of the data storage system housing 21, in turn, necessitates a concomitant reduction in the effective separation distance or clearance between the actuator latch 60 and the surface of the data storage disk 24. It is generally understood that a rotating or stationary structural component disposed in close proximity of a data storage disk 24 may interfere with the normal operation of the disk 24, or, more significantly, scrape, gouge, or otherwise damage the sensitive data storing regions of the data storage disk 24. The novel tilt limiting capability of the actuator latch assembly 58, however, prevents any such deleterious contact between then the actuator latch 60 and the data storage disk 24.

Figure 9:
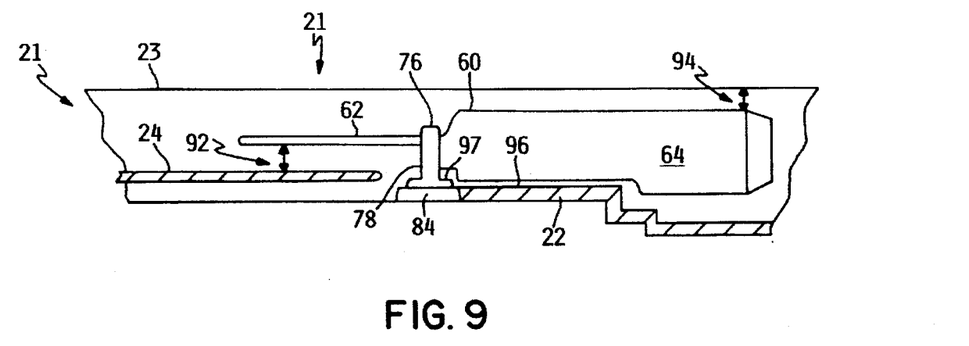
FIG. 9 is a side view of one embodiment of a novel tilt limiting actuator latch assembly installed in a VSFF data storage system.

Turning now to FIGS. 9-12, there are shown several embodiments of a novel tilt limiting actuator latch assembly 58 installed in a VSFF data storage system 29 having one or more data storage disks 24 for recording various types of data thereon. A single data storage disk 24 is shown in FIG. 9, with the inertia member 62, or latch wing, extending over a portion of the data storage disk surface 24. The actuator latch 60 is preferably rotatably mounted on the latch pin 76 extending from a latch boss 84. The latch boss 84 is preferably mounted to the base 22 of the data storage system housing 21, but may alternatively be mounted to a support structure mounted to or secured on the base 22 of the data storage system housing 21.

In the embodiment illustrated in FIG. 9, the novel tilt limiting actuator latch 60 is shown installed in a VSFF data storage system housing 21, with a housing cover 23 detachably secured to a housing base 22. A disk gap 92 is illustrated as the separation distance or clearance between the surface of the data storage disk 24 and a portion of the inertia member 62 overlapping the surface of the date storage disk 24. A tilt gap 94 is illustrated as the clearance between the restraining member 64 and a surface of the cover 23 of the data storage system housing 21. In this configuration, the actuator latch 60 is free to rotate about the latch pin 76, with a lower surface of a latch flange 97 of the actuator latch 60 rotating on a rotation surface 96 of the latch boss 84. When a strong rotational shock force is exerted on the data storage system housing 21, any resulting tilting of the inertia member 62 toward the data storage disk 24 is restricted by the restraining member 64 initially contacting the housing cover 23, thereby preventing contact between the inertia member 62 and the data storage disk 24. In the absence of an external rotational shock force being applied to the data storage system housing 21, the size of the tilt gap 94 and disk gap 92 typically remain substantially constant during normal data storage system 29 operation.

Figure 10:
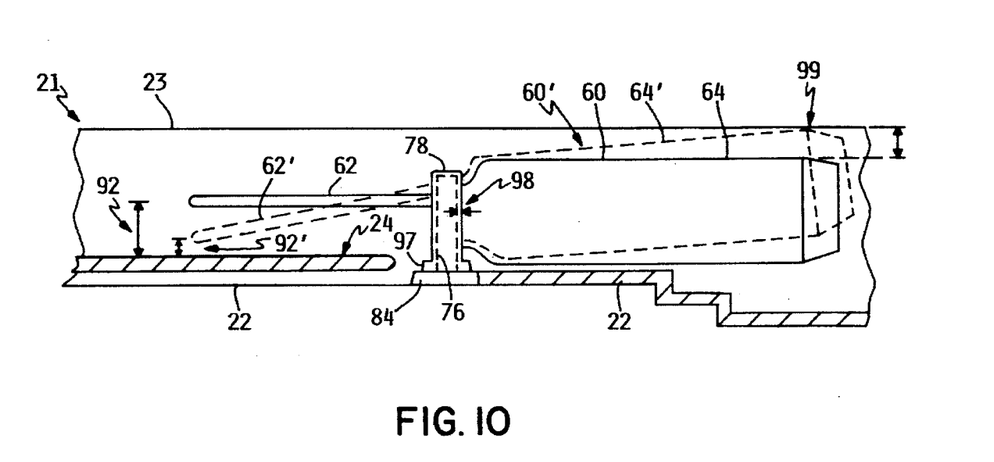
FIG. 10 is an illustration of the tilt limiting capability of a novel actuator latch that prevents damage to the surface of a data storage disk.

Referring now to FIG. 10, there is shown an illustration of a novel tilt limiting actuator latch 60 in an engaging orientation 60' superimposed over a depiction of the actuator latch 60 in a non-engaging orientation with respect to the actuator 30. In the absence of a strong rotational shock force exerted on the data storage system housing 21, the actuator latch 60 preferably remains in the non-engaging orientation. As such, a disk gap 92 is defined as the clearance between a surface of the data storage disk 24 and an overlapping portion of the inertia member 62, and a tilt gap 94 is defined as the clearance between the restraining member 64 and a surface of the housing cover 23.

In the presence of a sufficiently strong external rotational shock force, it has been determined that the actuator latch 60, preferably mounted on the latch pin 78 in a slip-fit manner, may tend to tilt slightly toward the data storage disk 24. The degree to which the actuator latch 60 tends to tilt is typically dependent on a number of factors, including the size of the slip gap 98 between the inner diameter of the hollow latch collar 78 and the outer diameter of the latch pin 76, and any mechanical flexing of the data storage disk 24 and actuator latch 60.

As illustrated in FIG. 10, deleterious contact between the inertia member 62 of the actuator latch 60 and the surface of the data storage disk 24 is prevented by the tilt limiting capability of the novel tilt limiting actuator latch assembly 58. The actuator latch 60' is depicted in a maximum tilting orientation when a sufficiently strong rotational shock force is applied to the data storage system housing 21. Undesirable contact between the inertia member 62' and the data storage disk surface 24 is prevented by initial contact between made between the restraining member 64' and a contact point 99 on a surface of the housing cover 23. The initial contact between the restraining member 64' and the housing cover 23 prevents the inertia member 62' from contacting the surface of the data storage disk 24.

In practice, the disk gap 92 defined between the data storage disk surface 24 and the inertia member 62 must be greater in size than the tilt gap 94 defined between the restraining member 64 and housing cover 23. In determining the respective sizes of the tilt gap 94 and disk gap 92, the length and height dimensions of the restraining member 64 and inertia member 62, as well as the anticipated maximum deflection of the data storage disk 24 and inertia member 62 resulting from in-phase and out-of-phase mechanical vibration, must be considered when computing the minimum acceptable size of the resultant tilt gap 92' formed when the actuator latch 60' is at a maximum tilt angle with respect to the latch pin 76.

Figure 11:
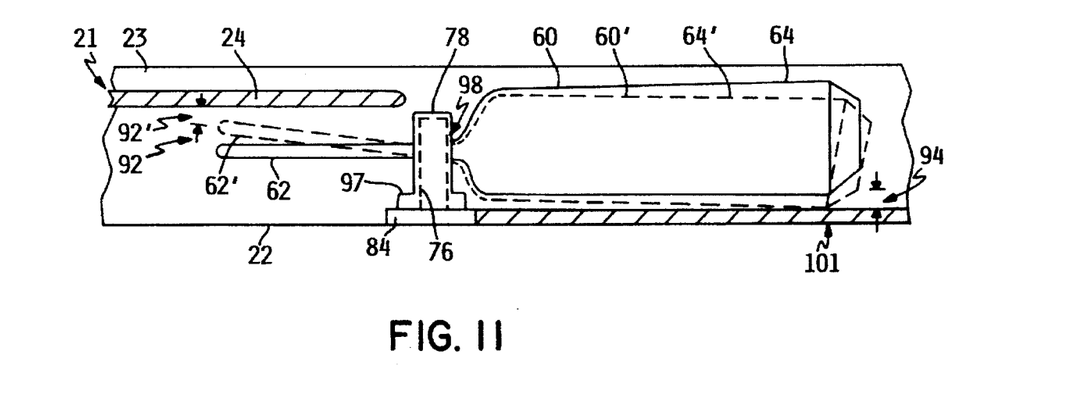
FIG. 11 is an illustration of the tilt limiting capability of another embodiment of a novel actuator latch that prevents damage to the surface of a data storage disk.

Another embodiment of the novel tilt limiting actuator latch 60 is illustrated in FIG. 11, wherein the inertia member 62 of the actuator latch 60 is situated to extend under, rather than above, a portion of the data storage disk 24. In this configuration, the latch collar 78 of the actuator latch 60 preferably includes a circumferential latch collar flange 97 adapted for rotating on the latch boss 84. A disk gap 92 is depicted as the clearance gap between the lower surface of the data storage disk 24 and an upper surface of the inertia member 62. A tilt gap 94 is illustrated as the clearance gap between a lower surface of the restraining member 64 and a surface of the housing base 22. Under the influence of a sufficiently strong external rotational shock force, the inertia member 62' of the actuator latch 60' may tend to tilt in an upward direction toward the data storage disk 24. The upward tilting of the inertia member 62' is restricted by initial contact being made between the restraining member 64' and the housing base 22 at a contact point 101. The inertia member 62' is thus prevented from contacting the lower surface of the data storage disk 24.

Figure 12:
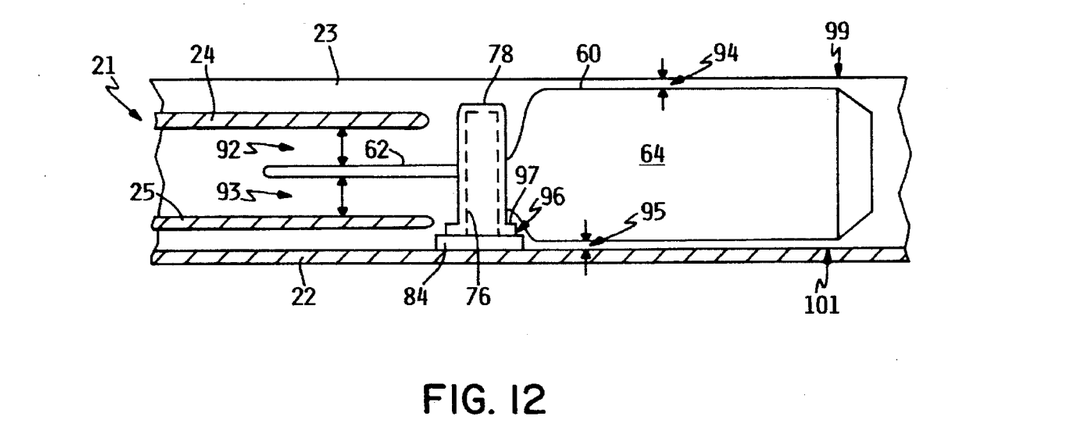
FIG. 12 is an illustration of another embodiment of a tilt limiting actuator latch installed in a VSFF data storage system comprising a plurality of data storage disks.

An alternative embodiment of the novel tilt limiting actuator latch 60 is illustrated in FIG. 12, and is adapted for use in a VSFF data storage system employing a plurality of data storage disks. It is noted that the data storage disks 24 and 25 may be formatted to store alphanumeric, audio, video, and other types of informational data, or a combination of data types. It should be understood that the novel actuator latch assembly 58 is not limited to use only with data storage systems employing magnetic disks, but may be employed in various types of systems to facilitate protection of other data storage mediums, such as CD-ROMs for example, when such systems are subjected to external rotational shock forces. Further, the actuator latch assembly 58 may be employed in data storage systems of varying configurations, and is not limited to use in small and very small form factor data storage systems.

The actuator latch 60 is preferably situated on the data storage system housing base 22 such that a portion of the inertia member 62 extends between a lower surface of a first data storage disk 24 and an upper surface of a second data storage disk 25. In this embodiment, the actuator latch 60 rotates about the latch pin 76, causing the inertia member 62 to rotate between the first and second data storage disks 24 and 25. An upper disk gap 92 is depicted as the clearance gap between the inertia member 62 and a lower surface of the first data storage disk 24. A lower disk gap 93 is illustrated as the clearance gap between the inertia member 62 and an upper surface of the second data storage disk 25. An upper tilt gap 94 is defined between a surface of the housing cover 23 and the restraining member 64, and a lower tilt gap 95 is defined between the restraining member 64 and a surface of the housing base 22. It is noted that the upper and lower disk gaps 92 and 93 may be of the same size or of different sizes. Similarly, the associated lower and upper tilt gaps 95 and 94 may be substantially the same in size or different in size.

A determination of the optimum sizes of the gaps 92, 93, 94, and 95 must generally account for the specific configuration and dimensions of the restraining member 64 and inertia member 62, the spacing between coaxially stacked first and second data storage disks 24 and 25, and the maximum anticipated mechanical deflection of the inertia member 62 and disks 24 and 25 in the presence of strong external rotational and translational shock forces. To prevent deleterious contact between the inertia member 62 and the first data storage disk 24, the upper disk gap 92 must be larger than the lower tilt gap 95 in order to accommodate the maximum upward tilting of the inertia member 62 toward the first data storage disk 24. In a similar manner, the lower disk gap 93 must be sufficiently larger in size than the upper tilt gap 94 to accommodate the maximum downward tilting of the inertia member 62 toward the second data storage disk 25.

Figure 5:
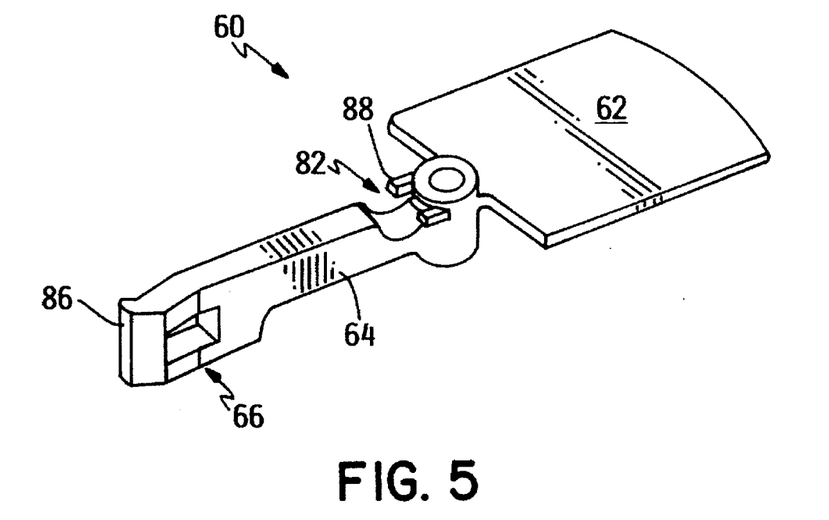
FIG. 5 is a top perspective view of the actuator latch component of a novel tilt limiting actuator latch assembly.
Figure 6:
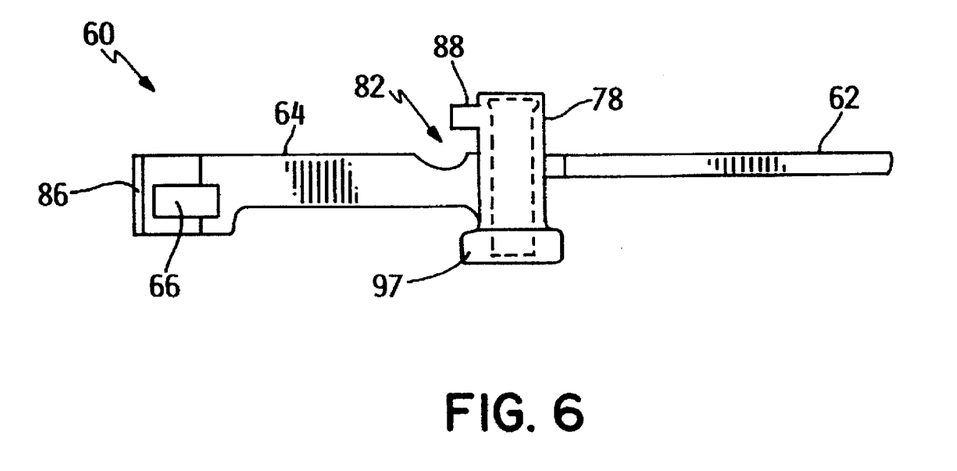
FIG. 6 is a side view of a novel tilt limiting actuator latch illustrating automatic registration and coupling features of the actuator latch assembly.

An important feature of the novel tilt limiting actuator latch assembly 58 provides for simple, accurate, and efficient installation of the actuator latch assembly 58 in a VSFF data storage system. The two-part actuator latch assembly 58 is particularly well-suited for top-down assembly of VSFF data storage systems in a high volume manufacturing environment. Referring now to FIGS. 5–7, the actuator latch assembly 58 is preferably installed after all other major components of the data storage system 29 have been properly mounted to the housing base 22. The latch pin 76 and latch boss 84 secured to the base 22 are the datum surfaces for the actuator latch 60, with the latch pin 76 situated at the appropriate location on the base 22, and the latch boss 84 dimensioned to elevate the actuator latch 60 to an appropriate height above the base 22. The latch spring 72, preferably a torsion-type spring, comprises a spring arm 74, a spring hook 80, and spring coils 71. The spring coils 71 are preferably formed to have a substantially cylindrical configuration for easy installation on a cylindrical spring pin 70. The magnitude of the biasing force produced by the latch spring 72 typically depends on the number of windings or coils 71, and the material comprising the latch spring 72.

An installer generally registers the through-hole of the latch collar 78 with the latch pin 76, and slips the actuator latch 60 onto the latch pin 76 until the latch collar flange 97 engages the latch boss 84. The latch spring 72 is then installed onto the spring pin 70, with the spring coils 71 fitted over the outer circumference of the spring pin 70. The installer may then move the spring arm 74 into locking engagement with the actuator latch 60, and place the spring hook 80 against the permanent magnet structure housing 39 or other fixed structure within the housing 21. When installed, the latch spring 72 biases the actuator latch 60 in the non-engaging orientation, preferably with the latch stop 86 of the restraining member 64 contacting a sidewall 35 of the housing base 22. Top-down installation of the actuator latch assembly 58 is completed by securing the housing cover 23 to the base 22.

An important feature of the novel tilt limiting actuator latch assembly 58 concerns the automatic alignment and coupling of the spring arm 74 with the actuator latch 60 to effectuate simple and accurate coupling and uncoupling of the latch spring 72 and the actuator latch 60. A locking slot 82 is preferably provided on the restraining member 64 proximate the latch collar 78 and configured for receiving the spring arm 74. A pair of locking tabs 88, protruding from the latch collar 78 above the locking slot 82, cooperate with the locking slot 82 to secure the spring arm 74 in a locked configuration with the actuator latch 60. An installer simply moves the spring arm 74 along the contour of the locking slot 82, and then releases the spring arm 74 against the locking tabs 88 when the spring arm 74 abuts the latch collar 78. No further adjustment of the novel actuator latch assembly 58 is required.

The unique self-locking feature of the actuator latch assembly 58 prevents unintended subsequent uncoupling of the latch spring 72 from the actuator latch 60 during operation, yet permits easy uncoupling of the spring arm 74 from the locking slot 82 when access to the data storage system components is necessary, typically during repair or renovation of the data storage system 29. The locking tabs 88 and locking slot 82 together provide self-aligned coupling of the latch spring 72 and actuator latch 60, and provide automatic registration of the actuator latch 60 in a non-engaging biased configuration with respect to the actuator 30. The installer need only mount the housing cover 23 to the housing base 22 to complete installation of the novel tilt limiting actuator latch assembly 58. During repair of the data storage system 29, uncoupling of the latch spring 72 from the actuator latch 60 is easily accomplished by the installer simply depressing the spring arm 74 away from the locking tabs 88 and swinging the spring arm 74 out of the locking slot 82.

The actuator latch 60 component of the novel tilt limiting actuator latch assembly 58 is preferably fabricated as an integral member fashioned from plastic material, but may alternatively be fabricated from metal or composite materials, for example. Various known molding and extrusion techniques may be employed in the fabrication of the actuator latch 60. The simple and elegant two-part actuator latch assembly 58 can be manufactured in bulk and at a very low cost. The novel tilt limiting actuator latch assembly 58 provides manufacturers of data storage systems the advantages of an inertial actuator latch particularly well-suited for high-volume, top-down assembling of VSFF data storage systems.

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A latch assembly for restraining an actuator rotatably mounted to a housing of a data storage system to prevent damage to a data storage disk disposed within the housing, the latch assembly comprising:

a latch body having a mounting surface mounting the latch body to the housing, the latch body being rotatable about an axis substantially perpendicular to a plane defined by a surface of the data storage disk, the latch body including:

a latch wing having a portion extending over a portion of the data storage disk; and a restraining member for restraining the actuator when the data storage system is subjected to an external rotational shock force; and bias means, coupled to the latch body, for biasing the restraining member in a non-engaging relationship with the actuator in the absence of the external rotational shock force;

wherein the latch body includes a contacting surface distanced from the mounting surface, and the housing includes a housing surface, the contacting surface being spaced from the housing surface in the absence of the external rotational shock force and contacting the housing surface when the data storage system is subjected to the external rotational shock force so as to prevent contact between the latch wing portion and the data storage disk portion.

2. An assembly as claimed in claim 1, wherein:

the data storage system comprises the data storage disk and a second data storage disk, the portion of the latch wing extending under a portion of the second data storage disk; and the contacting surface prevents contact between the latch wing portion and the second data storage disk.

3. An assembly as claimed in claim 1, wherein the latch body comprises locking means for registering and detachably coupling the bias means with the latch body.

4. An assembly as claimed in claim 1, wherein the contacting surface includes a surface of the restraining member.

5. An assembly as claimed in claim 1, wherein the housing comprises a cover, the housing surface including a surface of the cover.

6. An assembly as claimed in claim 1, wherein the housing comprises a base, the housing surface including a surface of the base.

7. An assembly as claimed in claim 1, wherein a tilt gap is defined between the contacting surface and the housing surface, the tilt gap being smaller in size than a disk gap defined between the latch wing portion and the data storage disk portion.

8. A latch assembly for restraining an actuator rotatably mounted to a housing of a data storage system to prevent damage to a data storage disk disposed within the housing, the latch assembly comprising:

a latch body having a mounting surface mounting the latch body to the housing, the latch body being rotatable about an axis situated beyond an outer periphery of the data storage disk, the latch body comprising:

a latch wing configured such that a portion of the latch wing extends over a portion of the data storage disk;

a restraining member for restraining the actuator when the data storage system is subjected to an external rotational shock force; and bias means, coupled to the latch body, for biasing the restraining member in a non-engaging relationship with the actuator in the absence of the external rotational shock force;

wherein the latch body includes a contacting surface distanced from the mounting surface, and the housing includes a housing surface, the contacting surface being spaced from the housing surface in the absence of the external rotational shock force and contacting the housing surface when the data storage system is subjected to the external rotational shock force so as to prevent contact between the latch wing portion and the data storage disk portion.

9. An assembly as claimed in claim 8, wherein the latch body comprises locking means for registering and detachably coupling the bias means with the latch body.

10. An assembly as claimed in claim 8, wherein the bias means includes a spring comprising:

a mounting portion detachably mounted on a spring pin secured to the housing; and a hooking portion detachably coupled with the latch body.

11. An assembly as claimed in claim 8, wherein the contacting surface includes a surface of the restraining member.

12. An assembly as claimed in claim 8, wherein:

the housing comprises a cover; and the housing surface includes a surface of the cover.

13. An assembly as claimed in claim 8, wherein:

the housing comprises a base; and the housing surface includes a surface of the base.

14. An assembly as claimed in claim 8, wherein a tilt gap is defined between the contacting surface and the housing surface, the tilt gap being smaller in size than a disk gap defined between the latch wing portion and the data storage disk portion.

15. A system for storing data, comprising;

a housing;

a data storage disk;

a spindle motor mounted to the housing for rotating the data storage disk;

an actuator rotatably mounted to the housing;

a transducer mounted to the actuator; and an actuator latch assembly, comprising:

a latch body having a mounting surface mounting the latch body to the housing, the latch body being rotatable about an axis substantially perpendicular to a plane defined by a surface of the data storage disk; the latch body including:

a latch wing having a portion extending over a portion of the data storage disk;

a restraining member for restraining the actuator from rotating when the data storage system is subjected to an external rotational shock force; and bias means for biasing the restraining member in a non-engaging relationship with the actuator in the absence of the external rotational shock force;

wherein the latch body includes a contacting surface distanced from the mounting surface, and the housing includes a housing surface, the contacting surface being spaced from the housing surface in the absence of the external rotational shock force and contacting the housing surface when the data storage system is subjected to the external rotational shock force so as to prevent contact between the latch wing portion and the data storage disk portion.

16. A system as claimed in claim 15, wherein the contacting surface comprises a surface of the restraining member.

17. A system as claimed in claim 15, wherein the housing comprises a cover and a base, the housing surface including a surface of at least one of the cover and the base, the contacting surface including a surface of the restraining member.

18. A system for storing data, comprising:

a housing;

a data storage disk;

a spindle motor mounted to the housing for rotating the data storage disk;

an actuator rotatably mounted to the housing;

a transducer mounted to the actuator; and an actuator latch assembly, comprising:

a latch body having a mounting surface mounting the latch body to the housing, the latch body being rotatable about an axis situated beyond an outer periphery of the data storage disk, the latch body including:

a latch wing having a portion extending over a portion of the data storage disk; and a restraining member for restraining the actuator from rotating when the data storage system is subjected to an external rotational shock force; and bias means for biasing the restraining member in a non-engaging relationship with the actuator in the absence of the external rotational shock force;

wherein the latch body includes a contacting surface distanced from the mounting surface, and the housing includes a housing surface, the contacting surface being spaced from the housing surface in the absence of the external rotational shock force and contacting the housing surface when the data storage system is subjected to the external rotational shock force so as to prevent contact between the latch wing portion and the data storage disk portion.

19. A system as claimed in claim 18, wherein the contacting surface includes a surface of the restraining member.

* * * * *